United States Patent
Zhang et al.

(10) Patent No.: US 8,369,209 B2
(45) Date of Patent: Feb. 5, 2013

(54) METHOD FOR PROCESSING COLLISION BETWEEN RANDOM ACCESS PROCEDURE AND MEASUREMENT GAP

(75) Inventors: Jian Zhang, Shenzhen (CN); Xiang Cheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 17 days.

(21) Appl. No.: 13/003,764

(22) PCT Filed: Mar. 31, 2009

(86) PCT No.: PCT/CN2009/071112
§ 371 (c)(1),
(2), (4) Date: Jan. 12, 2011

(87) PCT Pub. No.: WO2010/015155
PCT Pub. Date: Feb. 11, 2010

(65) Prior Publication Data
US 2011/0116364 A1   May 19, 2011

(30) Foreign Application Priority Data
Aug. 7, 2008 (CN) .......................... 2008 1 0146052

(51) Int. Cl.
*G01R 31/08* (2006.01)
*H04W 4/00* (2009.01)
*H04W 36/00* (2009.01)
*H04L 12/413* (2006.01)
*H04B 7/00* (2006.01)

(52) U.S. Cl. ........ 370/216; 370/252; 370/328; 370/445; 455/438; 455/522

(58) Field of Classification Search ........... 370/445–447
See application file for complete search history.

(56) References Cited

U.S. PATENT DOCUMENTS
2003/0189949 A1   10/2003   Belaiche
(Continued)

FOREIGN PATENT DOCUMENTS
CN   1257358 A   6/2000
CN   1450730 A   10/2003
(Continued)

OTHER PUBLICATIONS
International Search Report in international application No. PCT/CN2009/071112, mailed on Jul. 9, 2009.
(Continued)

*Primary Examiner* — Brandon Renner
(74) *Attorney, Agent, or Firm* — Oppedahl Patent Law Firm LLC

(57) ABSTRACT

A method for processing a collision between a random access procedure and a measurement gap, which involves a terminal and a base station, and the terminal is configured with a measurement gap; the method includes: when the random access procedure is a contention-based random access procedure, the terminal cancels the measurement gap if a random access response window or the operating time of a contention resolution timer has an overlap with the measurement gap. The concrete solution, that the priority of the random access procedure is higher than that of the measurement gap in the method provided by the present invention, improves the reliability of the random access procedure, reduces failure probability of the random access procedure, reduces the delay of the random access procedure, and effectively utilizes a measurement gap.

8 Claims, 5 Drawing Sheets

U.S. PATENT DOCUMENTS

| | | | | |
|---|---|---|---|---|
| 2004/0203445 | A1* | 10/2004 | Hwang | 455/67.11 |
| 2005/0018706 | A1* | 1/2005 | Myojo | 370/445 |
| 2007/0037600 | A1* | 2/2007 | Fukuda | 455/522 |
| 2007/0076644 | A1* | 4/2007 | Bachl et al. | 370/313 |
| 2008/0273606 | A1* | 11/2008 | Orfanos et al. | 375/260 |
| 2010/0027438 | A1* | 2/2010 | Cai | 370/252 |

FOREIGN PATENT DOCUMENTS

| | | | |
|---|---|---|---|
| EP | 1001572 | A1 | 5/2000 |
| EP | 1909523 | A1 | 4/2008 |
| EP | 1909523 | A1 * | 4/2008 |
| JP | 2003319452 | A | 11/2003 |
| JP | 2005210640 | A | 8/2005 |
| JP | 2007104010 | A | 4/2007 |
| WO | 2008072294 | A1 | 6/2008 |

OTHER PUBLICATIONS

English Translation of the Written Opinion of the International Search Authority in international application No. PCT/CN2009/071112, mailed on Jul. 9, 2009.

Dai, jiangfeng Research of collision resolution arithmetic of radio channel access technic.

* cited by examiner

Prior Art

METHOD FOR PROCESSING COLLISION BETWEEN RANDOM ACCESS PROCEDURE AND MEASUREMENT GAP

TECHNICAL FIELD

The present invention relates to a method for processing a random access procedure in a digital mobile communication system, particularly to a method for processing a collision between a random access procedure and a measurement gap in a radio communication system.

BACKGROUND

In a radio cellular communication system, a random access procedure is used when a terminal (also called as a user equipment UE) in an idle state (RRC_IDLE) initially accesses a network or a terminal in a connected state (RRC_CONNECTED) synchronizes with a network and acquires resource allocation for subsequent data communication.

In a 3rd generation mobile communication long term evolution (LTE) system, the following five events can trigger a random access procedure: (1) initial access in an idle state; (2) initial access after radio link failure (RLF); (3) handover (HO); (4) downlink data arrival in a connected state; and (5) uplink data arrival in a connected state. Moreover, there are two different types of the random access procedure: a contention-based procedure (applicable for all the five events) and a non-contention-based procedure (only applicable for event (3) and event (4) as above). After the success of the random access procedure, normal downlink or uplink transmission may begin.

A contention-based random access procedure is shown in FIG. 1, which includes four steps.

Step 1: a terminal transmits a random access preamble through an uplink random access channel (RACH).

Step 2: a medium access control (MAC) layer of a base station generates a random access response message, which is sent to the terminal over a downlink shared channel (DL-SCH).

This message at least includes a random access preamble identifier (RAPID), time alignment (TA) information, initial uplink grant (UL grant) and a temporary cell-radio network temporary identifier (Temporary C-RNTI), and this message is indicated through a random access-radio network temporary identifier (RA-RNTI) on a physical downlink control channel (PDCCH).

Step 3: the terminal sends a first scheduled transmission message on an uplink-shared channel (UL-SCH).

This message at least includes a cell-radio network temporary identifier (C-RNTI), an MAC element, or a common control channel service data unit (CCCH SDU), and the transmission of this message supports a hybrid automatic retransmission request (HARQ).

Step 4: the base station sends a contention resolution message on the DL-SCH.

This message is indicated through a C-RNTI or a temporary C-RNTI on the PDCCH, and the transmission of this message supports an HARQ.

A non-contention-based random access procedure is shown in FIG. 2, which includes the following three steps.

Step 0: a base station allocates a random access preamble to a terminal through a downlink dedicated signaling.

This signaling is generated by a target base station in the condition of handover and transmitted to the terminal by a source base station through a handover command (HO command); or it is transmitted to the terminal through a PDCCH if downlink data have arrived.

Step 1: the terminal transmits the allocated non-contention-based random access preamble through an uplink random access channel (RACH).

Step 2: the base station transmits a random access response message on a downlink-shared channel (DL-SCH).

This message at least includes time alignment information, a random access preamble identifier, and also includes initial uplink grant information in the condition of handover; and this message is indicated through a random access radio network temporary identifier (RA-RNTI) on the PDCCH.

The following time relations exist in the relational steps of the above random access procedure.

(1) Time for Transmitting the Random Access Preamble

As regards the time for transmitting the random access preamble in step 1, it is determined by the terminal according to the time for occurrence of the aforesaid five triggering events and/or a backoff value (overload indicator) stored by the terminal itself. The backoff value is initialized to 0. The base station may send a backoff value to the terminal via the random access response message in step 2 to determine the time for retransmission of the random access preamble in case of failure of the subsequent random access procedure. That is to say, the time for retransmission of the random access preamble, i.e. the time for transmitting the random access preamble next time depends on initial time of triggering the random access procedure and one backoff value. The typical configuration of the backoff value includes (0, 10, 20, 30, 40, 50, 60, 70, 80, 90, 100, 150, 200, 250, 300, 500, 1000), taking the millisecond (ms) as a unit. As regards the non-contention-based random access procedure triggered because of downlink data arrival, the time interval is 4 ms between the moment in step 0 that the terminal receives a subframe containing a PDCCH and the moment in step 1 that the terminal initially transmits the random access preamble.

(2) Random Access Preamble-Random Access Response

For a frequency divided duplex (FDD) mode, at 2 ms (the typical backoff length is 4 ms, and 2 ms is selected for reliability) after transmitting the random access preamble in step 1, the terminal monitors the RA-RNTI on the PDCCH in the time range of a transmission time interval window (RA_WINDOW_BEGIN-RA_WINDOW_END) (also called a random access response window) to receive the random access response message in step 2. The typical configuration of the length of the random access response window is from 2 ms to 10 ms.

For a time divided duplex (TDD) mode, the delay length after which the random access preamble is transmitted to the first subframe of the random access response relates to specific downlink/uplink subframe allocation. If the terminal successfully monitors the corresponding RA-RNTI on the PDCCH in the random access response window, and the random access preamble identifier contained in the random access response message corresponds to the random access preamble transmitted by the terminal, then the random access response is regarded as successfully received. The terminal may stop monitoring the random access response message after the random access response message is successfully received. For the non-contention-based random access procedure, it also means that the random access procedure is successful. If the terminal fails to receive the random access response message in the random access response window, or any random access preamble identifier in all received random access response messages does not correspond to the transmitted random access preamble, then it means that the receiving of the random access response message is failed. The failure of receiving of the random access response message means the failure of the random access attempt, and the terminal determines the time for a next random access attempt according to the backoff value if the random access preamble transmission maximum (PREAMBLE_TRANS_MAX) is not reached.

(3) Random Access Response-Scheduled Transmission

For the contention-based random access procedure, after the terminal successfully receives the random access response message in step 2, the time interval from the moment that the subframe indicated by the uplink grant of the message is received to the moment that the terminal transmits the scheduled transmission message in step 3 on the uplink-shared channel is greater than or equal to 6 ms.

(4) Scheduled Transmission-Contention Resolution

The terminal activates a contention resolution timer after transmitting the scheduled transmission message in step 3. During the operation of the timer, the terminal monitors the PDCCH to receive the contention resolution message in step 4. If the terminal successfully receives a corresponding C-RNTI or a temporary C-RNTI and other relevant messages are consistent, then the timer is stopped and the contention resolution is regarded as successful, i.e. the random access procedure is successful, otherwise, the contention resolution is regarded as failed; if the timer is overtime, the contention resolution is also regarded as failed. The failure of the contention resolution means the failure of the random access attempt. The terminal determines the time for a next random access attempt according to the backoff value before the random access preamble transmission maximum (PREAMBLE_TRANS_MAX) is reached. The typical configuration of the length of the contention resolution timer is (8, 16, 24, 32, 40, 48, 56 and 64), taking the ms as a unit.

(5) Random Access Attempt

A random access attempt is from the moment that the terminal transmits the random access preamble in step 1 to the moment that the random access attempt is successful or failed. If the HARQ is needed for many times in step 3, the procedure of the HARQ is regarded as the random access attempt. A successful random access attempt also means a successful random access procedure.

A random access procedure is from the moment that the random access preamble in step 1 is transmitted from the terminal for the first time to the moment that the random access procedure is successful, or from the moment that the random access preamble in step 1 is transmitted from the terminal for the first time to the moment that the random access preamble transmission maximum (PREAMBLE_TRANS_MAX) is reached, wherein it may contain many random access attempts and backoff values between random access attempts. After a random access attempt has failed, the terminal determines the time for next transmission of the random access preamble according to the backoff value to make a new random access attempt. After a random access procedure has succeeded, or the random access preamble transmission maximum is reached, the terminal determines the time for transmission of the random access preamble according to a new triggering event to make a new random access procedure.

According to the above analysis, the time length of a random access attempt is related to the length configuration of a random access response window, the length configuration of a contention resolution timer, the configuration of the HARQ transmission maximum in step 3, and the time of actual receiving of a random access response and a contention resolution message.

Besides the factors as above, the time occupied by a random access procedure is also related to the configuration of the backoff value and the configuration of the random access preamble transmission maximum; a high layer, i.e. an RRC layer, may also direct an MAC layer and a physical layer to terminate the random access procedure. If the length of the random access response window is configured as 10 ms and the length of the contention resolution timer is configured as 32 ms, for the non-contention-based random access procedure in the FDD mode, the maximum time length of a random access attempt is about 2 ms+10 ms=12 ms; and for the contention-based random access procedure in the FDD mode, the time length of a random access attempt is about 2 ms+10 ms+6 ms+32 ms=50 ms. In most cases, a random access attempt may succeed to complete a random access procedure, if the system is not overburdened. In a few cases, a random access procedure may succeed after many random access attempts, or still fail at last, wherein the maximum time is related to the real situation.

In the LTE system, when the terminal conducts inter-frequency or inter-RAT measurement (e.g. when the quality of a service cell is lower than a configured threshold), it needs a measurement gap to perform gap-assisted measurement. During the measurement gap, the terminal cannot monitor the PDCCH and the DL-SCH, nor could it implement transmission on the UL-SCH. The base station configures, activates and/or deactivates measurement gap parameters for the terminal through radio resource control (RRC) signaling. The length of the measurement gap is 6 ms or 8 ms, and the cycle is 40 ms or 120 ms (wherein after a cycle of 120 ms, the cycle may be changed to 80 ms, 128 ms or 160 ms later).

At present, in the 3rd generation partnership project (3GPP) RRC protocol 36.331 v8.2.0, a measurement gap configuration (MeasGapConfig) cell is contained in a measurement configuration cell. The MeasGapConfig cell contains a gap activation cell, which further contains two cells: an activate cell and a deactivate cell; the activate cell further contains three cells: a gap pattern (gapPattern) cell, a start system frame number (startSFN) cell and a start subframe number (startSubframeNumber) cell. It can be seen from the above-mentioned cell structure that the configuration and activation of the measurement gap take effect at the same time. After the measurement gap is configured and activated, the base station and the terminal should keep synchronistic in terms of operation of the measurement gap, and the base station should avoid scheduling uplink or downlink transmission of a corresponding terminal (including feedback information) during the measurement gap.

If the terminal is configured with a measurement gap which is activated, a collision may take place between the random access procedure and the measurement gap, i.e. an overlap may occur between the two in terms of time. For example, if the duration of a random access attempt is about 50 ms, the cycle of the measurement gap is 40 ms, the time within which some steps of the random access procedure happens may overlap with the measurement gap, and the overlap may happen in several early or later steps of the random access procedure.

According to the provisions of the existing 3GPP protocol, as a terminal cannot monitor a PDCCH and implement uplink transmission during a measurement gap, the terminal cannot implement relevant steps of a random access procedure, thereby leading to the failure or significant delay of the random access procedure. In many cases, a LTE system sets a strict requirement on the time of the random access process, e.g. in condition of handover or arrival of signaling data.

However, there is not yet a solution for the problem of a collision between a random access procedure and a measurement gap.

SUMMARY

The present invention aims to solve the technical problem by providing a method for processing a collision between a random access procedure and a measurement gap to effectively avoid the collision between the random access procedure and the measurement gap due to a time overlap so as to reduce the failure probability of the random access procedure.

To solve the above-mentioned technical problem, the present invention provides a method for processing a collision between a random access procedure and a measurement gap, which involves a terminal configured with a measurement gap and a base station. The method includes: when the random access procedure is a contention-based random access procedure, the terminal cancels the measurement gap if a random access response window or the operating time of a contention resolution timer has an overlap with the measurement gap.

Further, the method may also include:

the terminal performs processing by taking one of the following three ways in the contention-based random access procedure when there is an overlap between the measurement gap and a time period other than the random access response window or the operating time of the contention resolution timer:

a first way: keeping the measurement gap;

a second way: determining to cancel or keep the measurement gap according to the capability of the terminal; if the terminal is capable of completing the processing of uplink grant and the execution of gap-assisted measurement simultaneously in the time period, then keeping the measurement gap; if not, then cancelling the measurement gap; and a third way: canceling the measurement gap.

Further, the time period other than the random access response window and the operating time of the contention resolution timer may include: an idle time between every two consecutive random access attempts, or a time period from the moment that the terminal receives a random access response success message to the moment of transmitting a scheduled transmission message.

Further, the idle time between every two consecutive random access attempts may include: a time from the moment that the terminal fails to receive a random access response message to the moment that the terminal determines the next random access attempt, or a time from the moment that contention resolution is failed to the moment that the terminal determines the next random access attempt according to a backoff value when the random access preamble transmission maximum is not reached.

To solve the above-mentioned technical problem, the present invention also provides another method for processing a collision between a random access procedure and a measurement gap, which involves a terminal and a base station, wherein the terminal is configured with a measurement gap. The method includes: when the random access procedure is a non-contention-based random access procedure, the terminal cancels the measurement gap if there is an overlap between the measurement gap and a random access response window or a time from the moment that the terminal receives a random access preamble allocation message transmitted by the base station to the moment that the terminal transmits a random access preamble.

Further, the method may also include that: the terminal performs processing by taking one of the following three ways in the non-contention-based random access procedure if there is an overlap between the measurement gap and a time period other than the random access response window and the time from the moment that the terminal receives a random access preamble allocation message transmitted by the base station to the moment that the terminal transmits a random access preamble:

a first way: keeping the measurement gap;

a second way: determining to cancel or keep the measurement gap according to the capability of the terminal; if the terminal is capable of completing the processing of uplink grant and the execution of gap-assisted measurement simultaneously in the time period, then keeping the measurement gap; if not, then cancelling the measurement gap; and a third way: canceling the measurement gap.

Further, the other time period in the non-contention-based random access procedure may include an idle time between every two consecutive random access attempts, i.e. the time from the moment that the terminal fails to receive a random access response message to the moment that the terminal determines the next random access attempt.

To solve the above-mentioned technical problem, the present invention also provides another method for processing a collision between a random access procedure and a measurement gap, which involves a terminal and a base station, wherein the terminal is configured with a measurement gap, the method includes: the terminal cancels the measurement gap if a time period in the random access procedure has an overlap with the measurement gap;

if the random access procedure is a non-contention-based random access procedure, then the time period in the random access procedure includes: a random access response window or a time from the moment that the terminal receives a random access preamble allocation message transmitted by the base station to the moment that the terminal transmits a random access preamble; and if the random access procedure is a contention-based random access procedure, then the time period in the random access procedure includes any one of the following time periods: a time period between different moments that the terminal transmits a random access preamble, a random access response window, a time period from the moment of receiving a random access response success message to the moment of transmitting a scheduled transmission message, and the operating time of a contention resolution timer.

To solve the above-mentioned technical problem, the present invention provides yet another method for processing a collision between a random access procedure and a measurement gap, which involves a terminal and a base station, wherein the terminal is configured with a measurement gap; the method includes: the terminal in the random access procedure keeps the measurement gap in a time period which has an overlap with the measurement gap but does not affect the success of random access.

Further, the time period which has the overlap with the measurement gap but does not affect the success of random access may include: an idle time between every two consecutive random attempts.

Further, when the random access procedure is a contention-based random access procedure, the time period which has the overlap with the measurement gap but does not affect the success of random access may also include: a waiting time from the moment that the terminal receives a random access response success message to the moment that the terminal transmits a scheduled transmission message, and the terminal judges that the measurement gap does not affect the success of random access if the waiting time can fully cover the duration of the measurement gap.

To solve the above-mentioned technical problem, the present invention also provides another method for processing a collision between a random access procedure and a measurement gap, which involves a terminal and a base station, wherein the terminal is configured with a measurement gap; the method includes: the terminal in the random access procedure determines to cancel or keep the measurement gap in a time period which has an overlap with the measurement gap but does not affect the success of random access according to the capability of the terminal. If the terminal is capable of completing the processing of uplink grant and the execution of gap-assisted measurement simultaneously in the time period, then keeping the measurement gap; if not, then cancelling the measurement gap.

Further, the time period which has the overlap with the measurement gap but does not affect the success of random access may include: an idle time between every two consecutive random access attempts.

Further, when the random access procedure is a contention-based random access procedure, the time period which has the overlap with the measurement gap but does not affect the success of random access may also include: a waiting time from the moment that the terminal receives a random access response success message to the moment that the terminal transmits a scheduled transmission message; and the terminal judges that the measurement gap does not affect the success of random access if the waiting time can fully cover the duration of the measurement gap.

To solve the above-mentioned technical problem, the present invention also provides another method for processing a collision between a random access procedure and a measurement gap, which involves a terminal and a base station, wherein the terminal is configured with a measurement gap; the method includes: when the moment that the terminal determines to transmit a random access preamble has an overlap with the measurement gap, or when the moment that the terminal determines to transmit a random access preamble is before the measurement gap, and one or more steps of a subsequent random access procedure has an overlap with the measurement gap, if the terminal judges that a time from the moment of transmitting the random access preamble to the moment of the end of the measurement gap is less than a preconfigured time threshold, then keeping the measurement gap, i.e. delaying the transmitting time of the random access preamble to a moment after the end of the measurement gap.

Further, if the delay time for the terminal to transmit the random access preamble is greater than or equal to the preconfigured time threshold, then the measurement gap may be cancelled, and the random access preamble may be transmitted on time.

Further, the moment that the terminal determines to transmit a random access preamble may mean: the moment that the terminal transmits the random access preamble for the first time, or the moment that the terminal determines to transmit the random access preamble again according to a backoff value.

To solve the above-mentioned technical problem, the present invention also provides another method for processing a collision between a random access procedure and a measurement gap, which involves a terminal and a base station, wherein the terminal is configured with a measurement gap; and the random access procedure is a non-contention-based random access procedure, the method includes: before the base station prepares to transmit a random access preamble allocation message, if it judges that there is an overlap between the measurement gap and a time period from the moment of transmitting the random access preamble allocation message to the moment that the terminal transmits a random access preamble, then adjusting the moment of transmitting the random access preamble allocation message to the moment after the end of the measurement gap and before the start of the next measurement gap, so as to prevent the random access preamble allocation message from falling into the time range of the measurement gap when arriving at the terminal.

Further, the method may also include: the terminal reactivates the measurement gap after receiving a random access response message.

By using the present invention, in a random access attempt or procedure, a measurement gap in a collision can be cancelled, or by delaying transmission of relevant messages, a terminal can monitor a PDCCH, receive a DL-SCH and implement uplink transmission, so that it can transmit a random access preamble in step 1, receive a random access response message in a random access response window in step 2, transmit a scheduled transmission message in step 3 (including performing HARQ on the scheduled transmission message), and receive a contention resolution message and implements HARQ feedback to the message in step 4 (steps 1 to 4 are the four standard steps of a contention-based random access procedure).

In the methods provided by the present invention, the specific solution that the priority of a random access procedure is higher than that of a measurement gap improves the reliability of the random access procedure, reduces the failure probability of the random access procedure and the delay of the random access procedure, and effectively utilizes the measurement gap. The present invention also has advantages including flexibility, convenience, simplicity and consistency.

DETAILED DESCRIPTION

To solve the problem of failure or significant delay of a random access procedure due to a collision that may occur between the random access procedure and a measurement gap, the present invention provides a specific solution that the priority of the random access procedure is higher than that of the measurement gap, including an implied solution, an explicit-signaling solution, and an implied-and-explicit-signaling-combined solution. Wherein the implied solution means that a terminal gives a method and measure for resolving the collision on its own according to the occurrence of some scenarios without depending on explicit signaling control by the base station, which is applicable for a contention-based random access procedure and a non-contention-based random access procedure. The explicit-signaling solution means that a terminal executes a method and measure for resolving the collision under the signaling control by the base station, which is applicable for a non-contention-based random access procedure. The implied-and-explicit-signaling-combined solution is applicable for a contention-based random access procedure and a non-contention-based random access procedure, wherein the contention-based random access procedure is resolved by using the implied solution; and the non-contention-based random access procedure is resolved by using the explicit-signaling solution.

In the following, the above-mentioned technical solutions of this disclosure are expounded and explained in details in combination with the drawings and the preferred embodiments.

The implied solution will be explained in details in different scenarios of the following four embodiments. If a terminal is configured with a measurement gap which is activated, then a random access procedure is likely to be in collision with the measurement gap when the terminal transmits a random access preamble, receives a random access response message, transmits a scheduled transmission message, and receives a contention resolution message, i.e. the above scenarios have a full or partial overlap with the measurement gap in terms of time domain.

Embodiment 1

For the non-contention-based random access procedure, if a random access response window has an overlap with a measurement gap, then the terminal cancels the measurement gap.

For the contention-based random access procedure, if a random access response window has an overlap with a measurement gap, then the terminal cancels the measurement gap; if the operating time of a contention resolution timer has an overlap with a measurement gap, then the terminal cancels the measurement gap.

Figure 3:
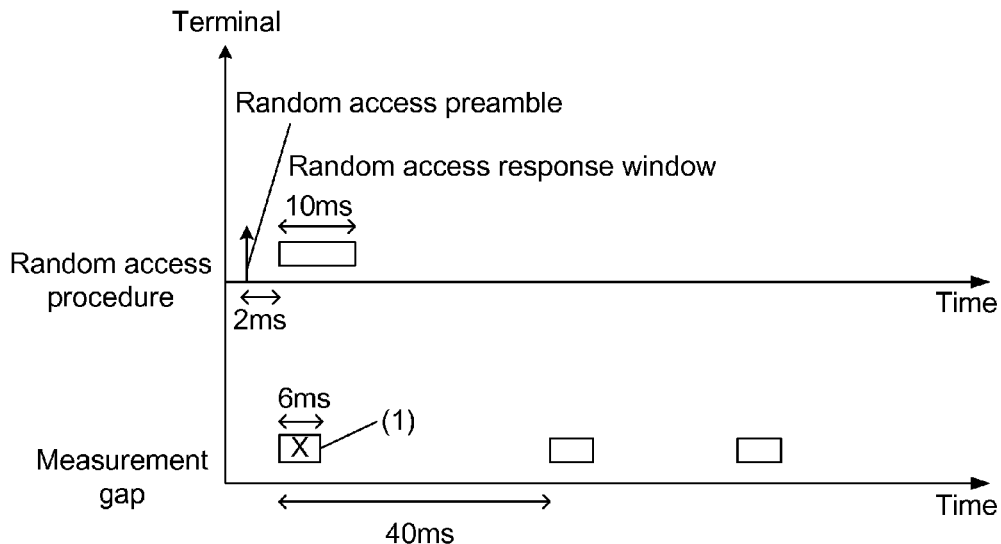
FIG. 3 and FIG. 4 are schematic diagrams illustrating embodiment 1 of the present invention.

As shown in FIG. 3, the length of the measurement gap is 6 ms, and its cycle is 40 ms. A random access preamble is transmitted 2 ms before the measurement gap, and the length of the random access response window is configured as 10 ms, so that the random access response window is in collision with the measurement gap. Under such condition, the terminal cancels the measurement gap, i.e. the measurement gap marked as (1) in FIG. 3 is cancelled to resolve the failure or significant delay of the random access procedure due to the collision between the random access response window and the measurement gap.

As mentioned above, if the terminal receives no random access response message in the random access response window, or if any random access preamble identifier in all received random access response messages does not correspond to the transmitted random access preamble, then the receiving of the random access response message is regarded as failed, i.e. the random access is failed. That is to say, if there is an overlap with the measurement gap in the random access response window, it would affect the terminal's normal receiving of the random access response message in the random access response window, leading to the failure of the random access. Therefore, in the random access response window, the priority of the random access procedure should be made higher than that of the measurement gap to ensure the success of random access.

Figure 4:
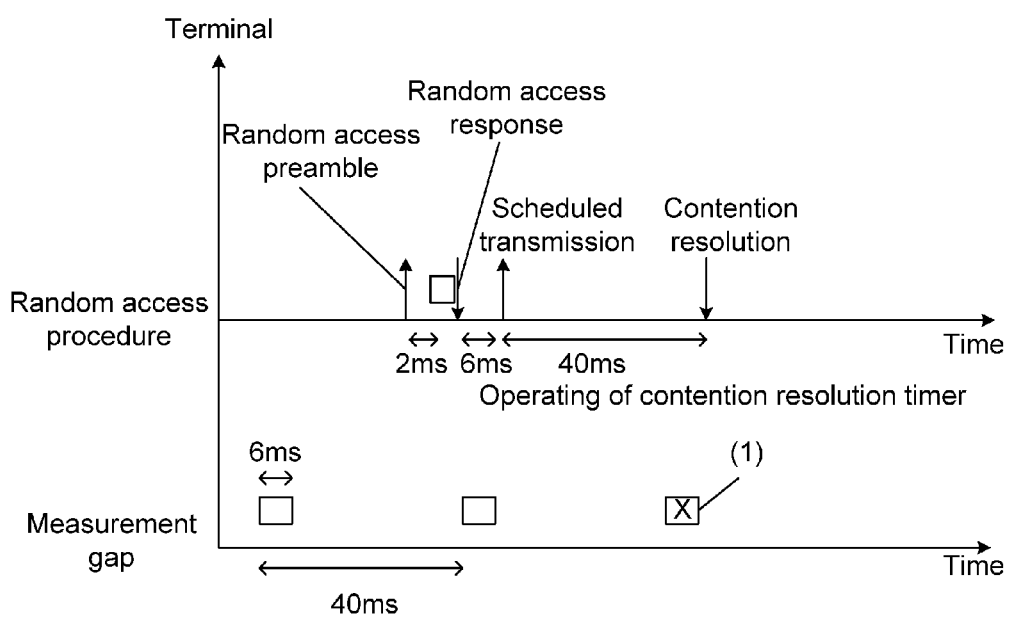

As shown in FIG. 4, the length of the measurement gap is 6 ms, and its cycle is 40 ms. For the contention-based random access procedure, the terminal activates the contention resolution timer after transmitting an uplink scheduled transmission message and the length of the timer is configured as 48 ms; the terminal receives a contention resolution message before overtime of the timer (supposing it occurs at 40 ms after the start of the timer); then, the measurement gap in the operating time of the contention resolution timer is cancelled by the terminal, i.e. the measurement gap marked as (1) in FIG. 4 is cancelled to resolve the failure or significant delay of the random access procedure due to the collision between the measurement gap and the operating time of the contention resolution timer.

As in the operating time of the contention resolution timer, the terminal monitors the PDCCH to receive the contention resolution message, if a corresponding C-RNTI or a temporary C-RNTI cannot be successfully received within the operating time of the contention resolution timer, or if the content of other relevant messages is inconsistent, then the contention resolution is regarded as failed, i.e. the random access procedure is failed. Therefore, in the operating time of the contention resolution timer, the priority of the random access procedure should be made higher than that of the measurement gap to ensure the success of random access.

Embodiment 2

For the contention-based random access procedure, if a measurement gap is configured, and if the time between receiving of a random access response success message and transmitting a scheduled transmission message has an overlap with the measurement gap, then the terminal keeps the measurement gap. The scheduled transmission message is transmitted after the end of the measurement gap, i.e. if the transmitting moment of the scheduled transmission message has a partial overlap with the measurement gap, then the transmitting moment of the scheduled transmission message is allowed to be delayed as appropriate to a moment after the measurement gap.

Figure 5:
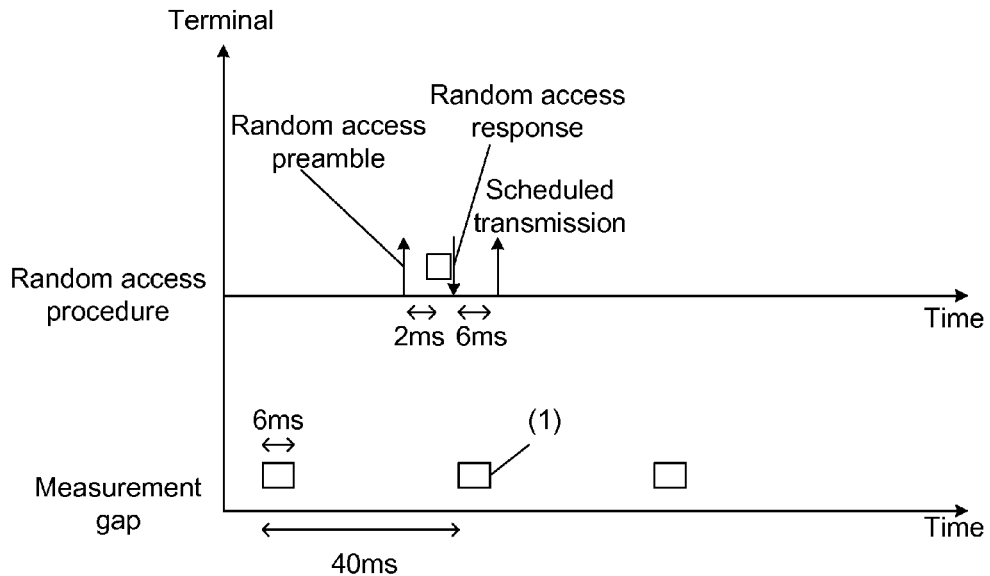
FIG. 5 is a schematic diagram illustrating embodiment 2 of the present invention.

As shown in FIG. 5, the length of the measurement gap is 6 ms, and its cycle is 40 ms. For the contention-based random access procedure, the length of a random access response window is configured as 10 ms, and a time gap for processing which is greater than or equal to 6 ms (configured as 8 ms) exists between the moment that the terminal receives a random access response message during the random access response window but stops monitoring the PDCCH in advance and the moment of transmitting the scheduled transmission message, supposing that there is a measurement gap (1) during this period; then during this period, besides processing uplink grant (UL grant), the terminal should also keep the measurement gap to execute gap-assisted measurement, i.e. the measurement gap marked as (1) in FIG. 5 is kept. In the random access procedure, the uplink grant is contained in the random access response message, which means that the base station transmits information about wireless resources and modulated coding solution (MCS) allocated by the uplink message to the terminal. As the time gap greater than or equal to 6 ms is enough to provide 6 ms for the operation of the measurement gap, the time period will not be in collision with the measurement gap.

Of course, if the measurement gap is configured in the contention-based random access procedure, the terminal may directly cancel the measurement gap if the time between receiving a random access response success message and transmitting a scheduled transmission message has an overlap with the measurement gap, so as to reduce delay, improve reliability, and simplify the processing procedure of the terminal.

Or, if the measurement gap is configured in the contention-based random access procedure, the terminal can also determine whether to cancel the measurement gap or to keep the measurement gap according to the capability of the terminal if the time between receiving a random access response success message and transmitting a scheduled transmission message has an overlap with the measurement gap. If the transmitting time of the scheduled transmission message has a partial overlap with the measurement gap, the transmitting time of the scheduled transmission message is allowed to be delayed as appropriate to a moment after the measurement gap according to the capability of the terminal. Here, the capability of the terminal means whether the terminal can complete the processing of the uplink grant and the execution of the gap-assisted measurement in the measurement gap simultaneously in the time period.

Embodiment 3

If the terminal is configured with a measurement gap, in the random access procedure, the terminal keeps the measurement gap if an idle time between every two consecutive random access attempts has an overlap with the measurement gap. If in the random access procedure, the idle time between every two consecutive random access attempts (including during a backoff value) can fully cover the duration of the measurement gap, the measurement gap is effective; if the duration of the measurement gap is on the point of passing the start moment of the next random access attempt, the measurement gap is effective, and the terminal delays the transmitting time of the random access preamble to a moment after the measurement gap.

The so called idle time between every two consecutive random access attempts at least includes the following scenarios: from the failure moment of receiving the random access response message to the start moment of the next random access attempt determined by the terminal according to a backoff value before the random access preamble transmission maximum is reached; and from the failure moment of contention resolution to the start moment of the next random access attempt determined by the terminal according to a backoff value before the random access preamble transmission maximum is reached.

Figure 6:
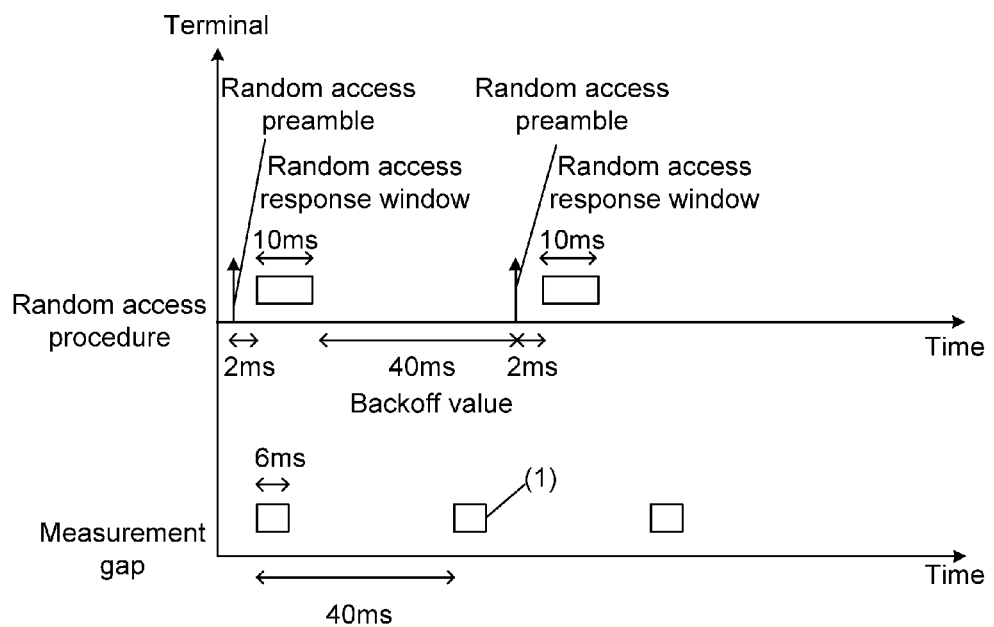
FIG. 6 is a schematic diagram illustrating embodiment 3 of the present invention.

As shown in FIG. 6, the length of the measurement gap is 6 ms, and its cycle is 40 ms. The terminal is configured with a backoff value of 40 ms in an access attempt. The terminal receives no random access response message in the random access response window during another access attempt; the terminal determines the next random access attempt according to the backoff value; if a measurement gap exists in the period of the backoff value, then the measurement gap will be kept. As the backoff value of 40 ms is enough to provide 6 ms for operation of the measurement gap, i.e. the time period of 40 ms is not in collision with the measurement gap, the measurement gap thus can be kept.

If the duration of the measurement gap is on the point of passing the start moment of the next random access attempt, as the time from the next random access preamble to a subsequent random access response window is only 2 ms, the measurement gap generated at this moment will be in collision with the subsequent random access response window, the terminal is required to delay the transmitting time of the random access preamble to a moment after the measurement gap to avoid generating a measurement gap which will be in collision with a subsequent random access response window.

Of course, in a random access procedure in which a measurement gap is configured, the terminal also can directly cancel the measurement gap to reduce delay and simplify processing if the duration of the measurement gap between every two consecutive random access attempts will pass the start moment of the next random access attempt.

Embodiment 4

If the terminal is configured with a measurement gap, in the random access procedure, the terminal determines whether to delay to transmit a random access preamble according to a time threshold.

If the moment that the terminal determines to transmit a random access preamble has an overlap with the measurement gap, or if the moment that the terminal determines to transmit a random access preamble is before the measurement gap, and one or more steps of the subsequent random access procedure may have an overlap with the measurement gap, then the terminal may delay the transmitting time of the random access preamble to a moment after the measurement gap when the delay time of the random access preamble is less than a preconfigured time threshold, so as to avoid a subsequent random access procedure from being in collision with the measurement gap, i.e. in such scenario, the terminal will keep the measurement gap effective; if the delay time for avoiding the collision between the subsequent access procedure and the measurement gap is greater than or equal to the time threshold, then the terminal cancels the corresponding measurement gap and transmits the random access preamble on time. For the latter scenario, if the random access preamble is not transmitted on time, it will result in a significant delay of the random access procedure.

The so-called moment that the terminal determines to transmit a random access preamble means the moment that the terminal transmits the random access preamble for the first time or the moment that the terminal determines to transmit the random access preamble again according to a backoff value.

Figure 7:
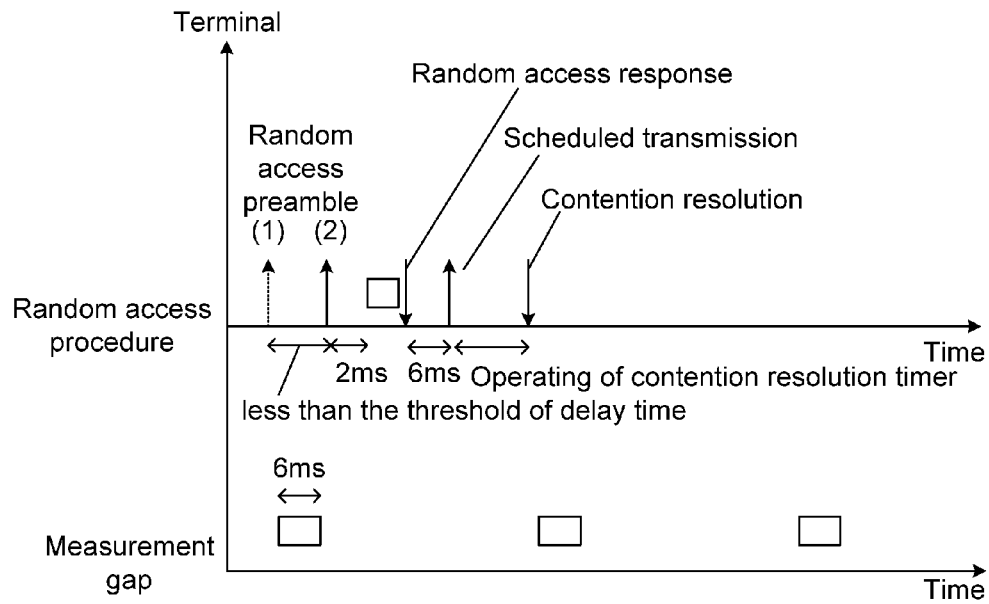
FIG. 7 is a schematic diagram illustrating embodiment 4 of the present invention.

As shown in FIG. 7, the length of the measurement gap is 6 ms, and its cycle is 40 ms. If the terminal is to transmit the random access preamble at location (1), then the random access response message will be in collision with the measurement gap; therefore, the terminal judges that, if it delays the transmitting time of the random access preamble to location (2), the delay time is less than one preconfigured time threshold, the collision between the subsequent random access response message and the measurement gap thus can be avoided, further, the collision between the whole random access procedure and the measurement gap can be avoided, then the terminal will delay the transmitting time of the random access preamble to location (2) and will not transmit the random access preamble at location (1).

The Embodiments 1-4 as above are used to describe that, in this disclosure, for either the non-contention-based random access procedure or the contention-based random access procedure, in order to resolve the problem of a collision between a random access procedure and a measurement gap, the terminal in the random access procedure cancels the measurement gap in a time period which has an overlap with the measurement gap and affects the success of the random access; the terminal in the random access procedure keeps the measurement gap in a time period which has an overlap with the measurement gap but does not affect the success of the random access, or it determines whether to keep or cancel the measurement gap in this time period according to the capability of the terminal; or, in order to simplify the processing procedure of the terminal, in a random access attempt (including the whole procedure from transmitting a random access preamble by the terminal to the resolution of conflict), if the random access procedure has an overlap with the measurement gap, then the measurement gap will be directly cancelled; if the moment that the terminal determines to transmit the random access preamble has an overlap with the measurement gap, or if the moment that the terminal determines to transmit the random access preamble is before the measurement gap, and one or more steps of the subsequent random access procedure may have an overlap with the measurement gap in terms of time, then it will determine whether to delay the transmitting time of the random access preamble to a moment after the measurement gap according to the relationship between the delay time of the random access preamble and a preconfigured time threshold.

The detailed explanation of the explicit-signaling solution is given by using the following embodiment.

Embodiment 5

Figure 1:
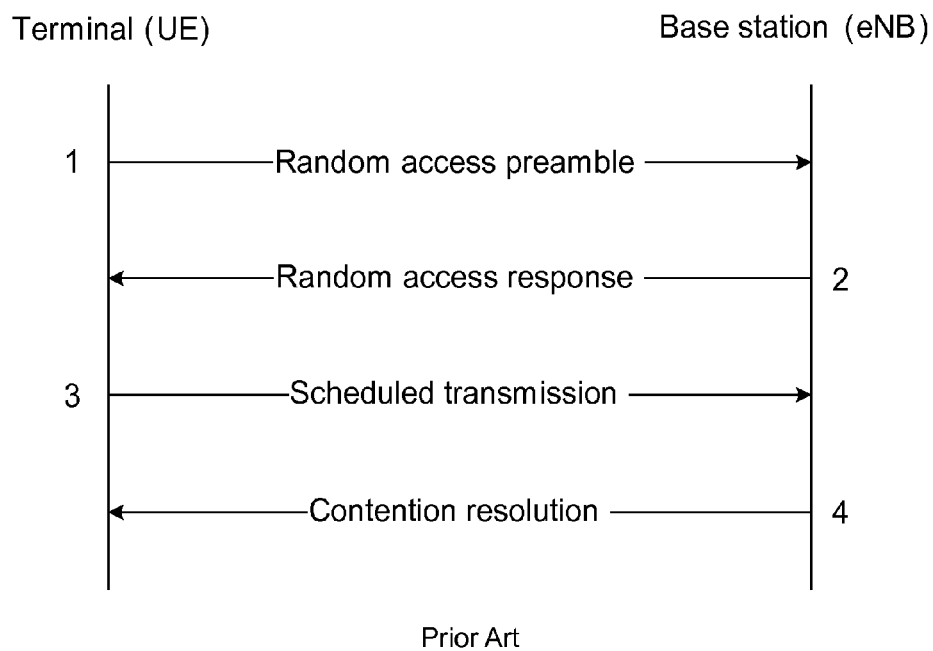
FIG. 1 shows steps of a contention-based random access procedure in the existing protocol.
Figure 2:
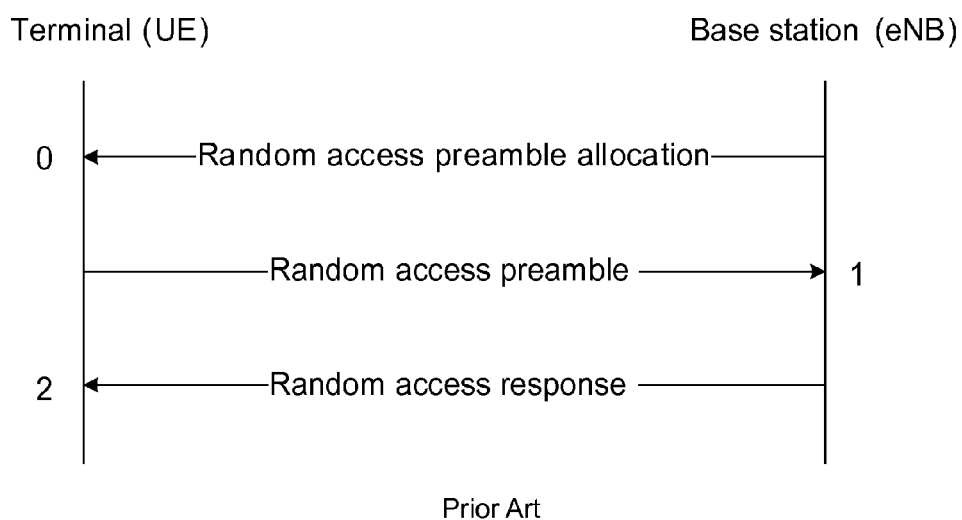
FIG. 2 shows steps of a non-contention-based random access procedure in the existing protocol.

For the non-contention-based random access procedure, if the terminal is configured with a measurement gap, then the terminal cancels the measurement gap after receiving a random access preamble allocation message, if a subsequent random access procedure has an overlap with the measurement gap, wherein the random access preamble allocation message corresponds to step 0 of the non-contention-based random access procedure (also called as message 0), as shown in FIG. 2.

Figure 8:
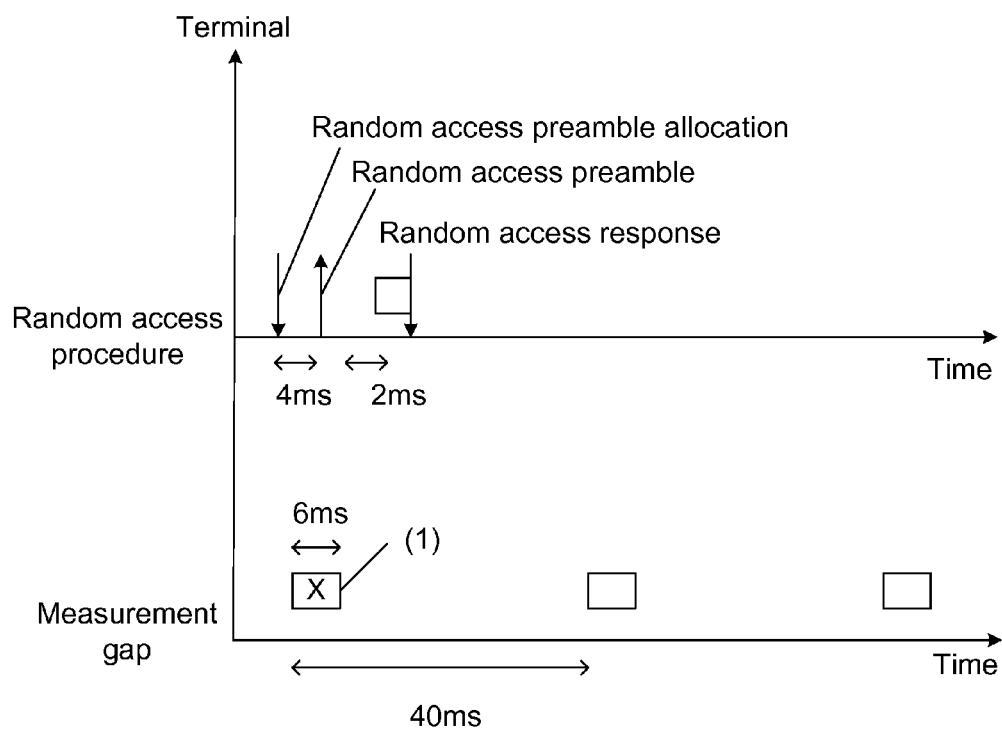
FIG. 8 is a schematic diagram illustrating embodiment 5 of the present invention.

As shown in FIG. 8, the length of the measurement gap is 6 ms, and its cycle is 40 ms. For the non-contention-based random access procedure, the terminal cancels the measurement gap after receiving the random access preamble allocation message, i.e. the measurement gap marked as (1) as shown in FIG. 8 is cancelled; the terminal reactivates the measurement gap after receiving a random access response message.

Or, the base station adjusts the transmitting time of the message 0, so that the terminal will not be in collision with the measurement gap while transmitting the random access preamble and receiving the random access response. When transmitting the message 0, by scheduling, the base station prevents the message 0 from falling into the time range of the measurement gap when it arrives at the terminal, so that the terminal can receive the message. The base station prevents a time period, during which the terminal transmits the random access preamble and receives the random access response, from being in collision with the measurement gap according to the time distance between the moment that the terminal receives the message 0 and a subsequent measurement gap. The terminal automatically reactivates the measurement gap after having successfully receiving the random access response message.

Figure 9:
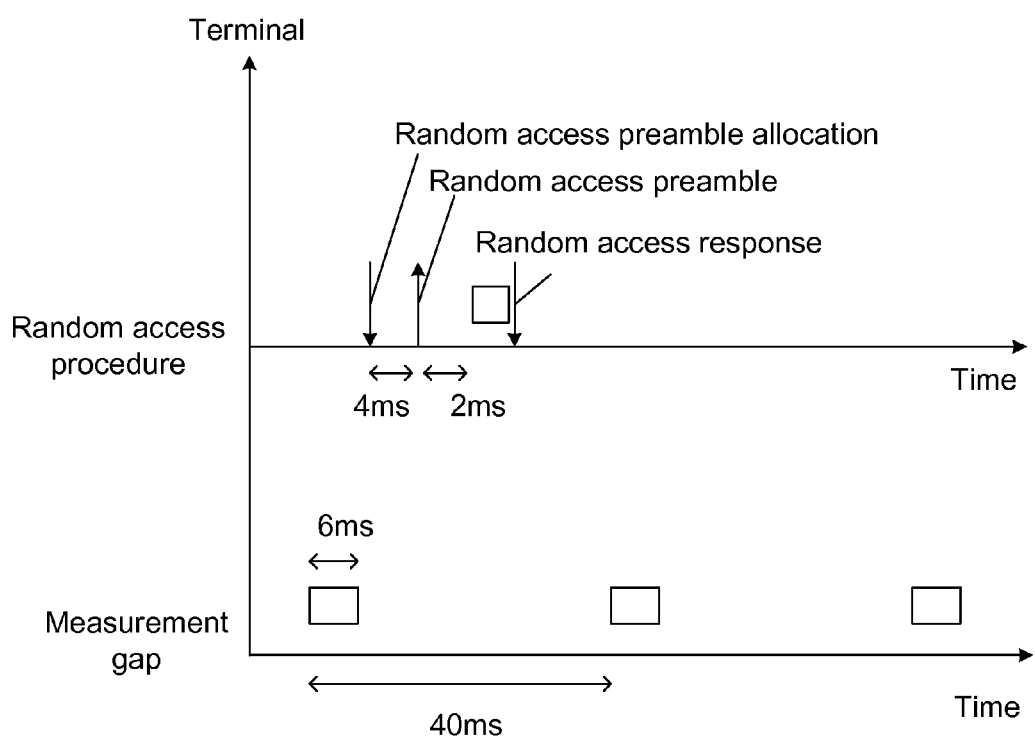
FIG. 9 is a schematic diagram illustrating embodiment 6 of the present invention.

As shown in FIG. 9, for the non-contention-based random access procedure, the base station adjusts the transmitting time of message 0, so that the terminal will not be in collision with the measurement gap when transmitting the random access preamble and receiving the random access response.

The implied-and-explicit-signaling-combined solution is applicable for the contention-based random access procedure and the non-contention-based random access procedure, wherein the contention-based random access procedure uses the implied solution, while the non-contention-based random access procedure uses the explicit-signaling solution.

As regards the methods of the present invention, in a random access attempt or procedure, a measurement gap in collision may be cancelled, or through delaying the transmitting of relevant messages, a terminal can monitor a PDCCH, receive a downlink-shared channel (DL-SCH), and implement uplink transmission, thus to transmit a random access preamble in step 1 and receive a random access response message in a random access response window in step 2; for a contention-based random access, it can transmit a scheduled transmission message (including performing HARQ on the scheduled transmission message) in step 3, and receive a contention resolution message and implement HARQ feedback to the message in step 4. The present invention improves the reliability of the random access procedure, lowers the failure probability of the random access procedure, reduces the delay of the random access procedure, and effectively utilizes the measurement gap.

INDUSTRIAL APPLICABILITY

The present invention improves the reliability of a random access procedure, lowers the failure probability of the random access procedure, reduces the delay of the random access procedure, and effectively utilizes a measurement gap.

What is claimed is:
1. A method for processing a collision between a random access procedure and a measurement gap, the method comprising the steps, carried out during the measurement gap, of:
configuring, by a base station, a measurement gap to a terminal for conducting an inter-frequency or an inter-RAT measurement;
performing, by the terminal, a random access procedure for accessing a network or synchronizing with the network and acquiring resource allocation, wherein the random access procedure is a contention-based random access procedure, and comprises the steps of:
transmitting, by the terminal, a random access preamble through an uplink random access channel (RACH) to the base station;
monitoring, by the terminal, the Physical Downlink Control Channel (PDCCH) for a random access response message transmitted from the base station during a random access response window;
transmitting, by the terminal, a scheduled transmission message on an Uplink-Shared Channel (UL-SCH), and activating a contention resolution timer after transmitting the scheduled transmission message; and
monitoring, by the terminal, the Physical Downlink Control Channel (PDCCH) for a contention resolution message transmitted from the base station;
canceling, by the terminal, the measurement gap if the random access response window or the operating time of the contention resolution timer has an overlap with the measurement gap.
2. The method according to claim 1, further including:
the terminal performing processing by taking one of the following three ways in the contention-based random access procedure when there is an overlap between the measurement gap and a time period other than the random access response window or the operating time of the contention resolution timer:
a first way: keeping the measurement gap;
a second way: determining to cancel or keep the measurement gap according to the capability of the terminal; if the terminal is capable of completing the processing of uplink grant and the execution of gap-assisted measure- ment simultaneously in the time period, then keeping the measurement gap; if not, then cancelling the measurement gap; and a third way: canceling the measurement gap.

3. The method according to claim 2, wherein the time period other than the random access response window and the operating time of the contention resolution timer includes: an idle time between every two consecutive random access attempts, or a time period from the moment that the terminal receives a random access response success message to the moment of transmitting a scheduled transmission message.

4. The method according to claim 3, wherein the idle time between every two consecutive random access attempts includes: a time from the moment that the terminal fails to receive a random access response message to the moment that the terminal determines the next random access attempt, or a time from the moment that contention resolution is failed to the moment that the terminal determines the next random access attempt according to a backoff value when the random access preamble transmission maximum is not reached.

5. A method for processing a collision between a random access procedure and a measurement gap, the method comprising the steps, carried out during the measurement gap, of:

configuring, by a base station, a measurement gap to a terminal for conducting an inter-frequency or an inter-RAT measurement;

performing, by the terminal, a random access procedure for accessing a network or synchronizing with the network and acquiring resource allocation, wherein the random access procedure is a non-contention-based random access procedure, and comprises the steps of:

receiving, by the terminal, a random access preamble allocation message transmitted by the base station;

transmitting, by the terminal, a random access preamble through an uplink random access channel (RACH) to the base station;

monitoring, by the terminal, the Physical Downlink Control Channel (PDCCH) for a random access response message transmitted from the base station during a random access response window;

canceling, by the terminal, the measurement gap if there is an overlap between the measurement gap and the random access response window or a time from the moment that the random access preamble allocation message is received to the moment that the terminal transmits the random access preamble.

6. The method according to claim 5, further including:

the terminal performing processing by taking one of the following three ways in the non-contention-based random access procedure if there is an overlap between the measurement gap and a time period other than the random access response window and the time from the moment that the terminal receives a random access preamble allocation message transmitted by the base station to the moment that the terminal transmits a random access preamble:

a first way: keeping the measurement gap;

a second way: determining to cancel or keep the measurement gap according to the capability of the terminal; if the terminal is capable of completing the processing of uplink grant and the execution of gap-assisted measurement simultaneously in the time period, then keeping the measurement gap; if not, then cancelling the measurement gap; and a third way: canceling the measurement gap.

7. The method according to claim 6, wherein the other time period in the non-contention-based random access procedure includes the time from the moment that the terminal fails to receive a random access response message to the moment that the terminal determines the next random access attempt.

8. A method for processing a collision between a random access procedure and a measurement gap, the method comprising the steps, carried out during the measurement gap, of:

configuring, by a base station, a measurement gap to a terminal for conducting an inter-frequency or an inter-RAT measurement;

performing, by the terminal, a random access procedure for accessing a network or synchronizing with the network and acquiring resource allocation, wherein the random access procedure is a contention-based random access procedure, and comprises the steps of:

transmitting, by the terminal, a random access preamble through an uplink random access channel (RACH) to the base station;

monitoring, by the terminal, the Physical Downlink Control Channel (PDCCH) for a random access response message transmitted from the base station during a random access response window;

transmitting, by the terminal, a scheduled transmission message on an Uplink-Shared Channel (UL-SCH), and activating a contention resolution timer after transmitting the scheduled transmission message; and monitoring, by the terminal, the Physical Downlink Control Channel (PDCCH) for a contention resolution message transmitted from the base station;

canceling, by the terminal, the measurement gap if a time period in the random access procedure has an overlap with the measurement gap;

wherein the time period in the random access procedure including any one of the following time periods: a time period between different moments that the terminal transmits the random access preamble, the random access response window, a time period from the moment of receiving a random access response success message to the moment of transmitting the scheduled transmission message, and the operating time of a contention resolution timer.

* * * * *